Nov. 29, 1955    E. J. GRIMMER    2,725,538
TRANSFORMER WINDINGS
Filed June 14, 1952
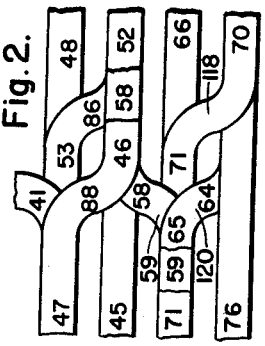
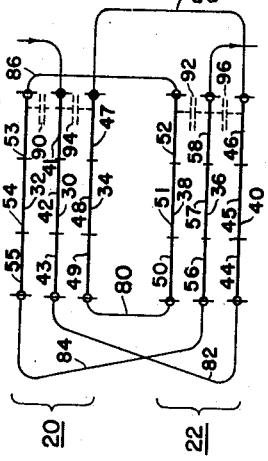
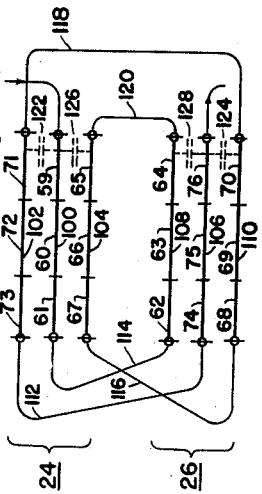
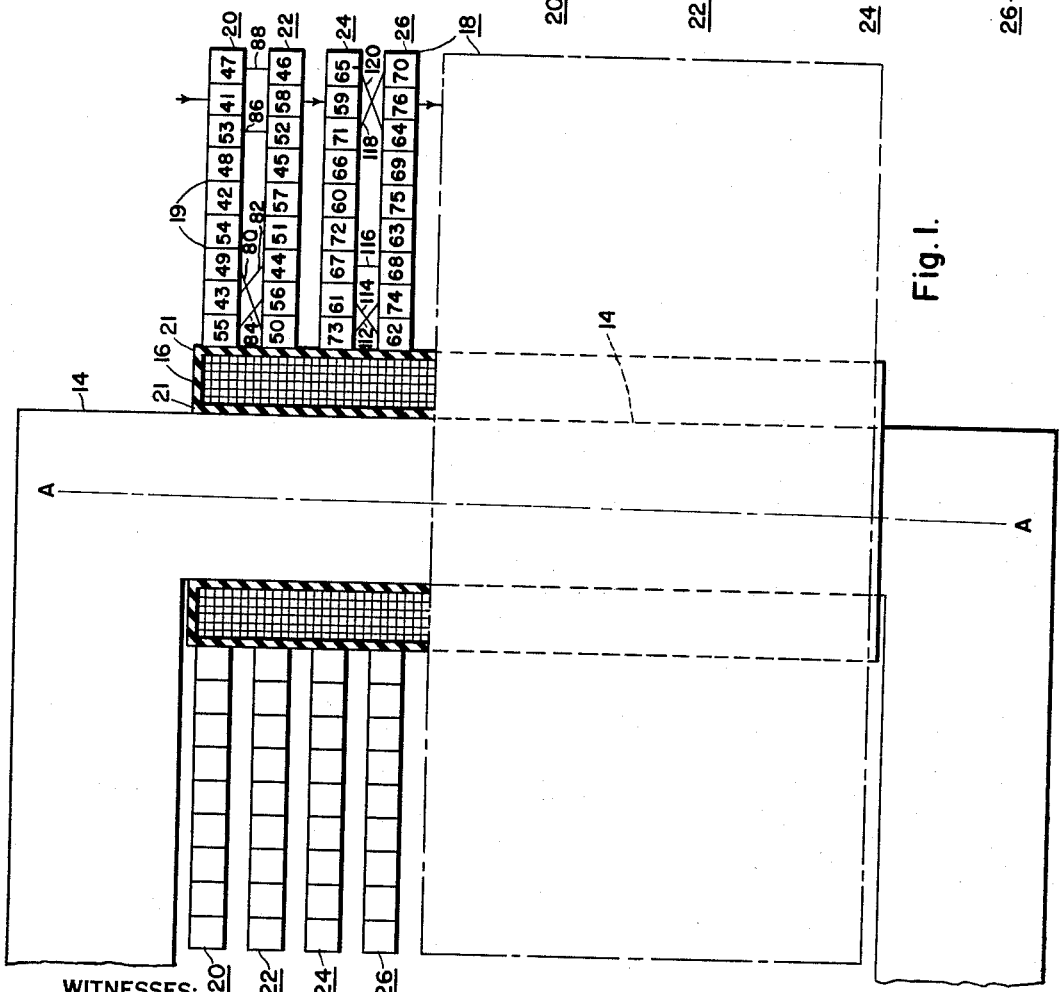
WITNESSES:
John E. Keasley
R. H. Thomas
INVENTOR
Elmer J. Grimmer
BY
Ezra W. Savage
ATTORNEY

United States Patent Office 2,725,538
Patented Nov. 29, 1955

2,725,538

TRANSFORMER WINDINGS

Elmer J. Grimmer, Sharpsville, Pa., assignor to Westinghouse Electric Corporation, East Pittsburgh, Pa., a corporation of Pennsylvania Application June 14, 1952, Serial No. 293,618

5 Claims. (Cl. 336—70)

This invention relates to transformers and more particularly to means for preventing damage to the transformer by surge voltages applied to an inductive winding of the transformer.

In the windings of transformers that are connected to transmission lines, the voltage between the terminals of the winding varies uniformly from one end of the winding to the other under normal frequency and voltage conditions of the system. However, during certain conditions of the system, such as may be caused by lightning on the transmission line, a high voltage surge may be impressed on the winding of the transformer causing nonuniform distribution of that voltage and unequal voltage stresses throughout the winding.

One method of protecting the transformer against these surge voltages is to apply large amounts of insulating material between sections of the winding sufficient to withstand the greatest of the unequal voltage stresses. However, if sufficient insulating material is applied between sections of the winding, and about the conductors, the space factor of the winding will become so large as to affect the efficiency of the design. It is, therefore, desirable to provide for lessening the voltage stresses between the several parts of the winding that are caused by the concentration of surge voltages in order to produce a more effective and efficient structure. One method of doing this is to increase the effective through capacitance of the inductive winding.

Heretofore the effective through capacitance of the inductive winding of the transformer has been increased by providing a parallel capacitance path in the winding by disposing a turn forming the first turn of a portion of an inductive winding adjacent to another turn of the inductive winding which forms the next to the last turn of said portion of the winding. With such an arrangement relatively thick insulating material has to be disposed between these turns of the winding in order to prevent an electrical breakdown therebetween. When such thick insulating material is utilized, it decreases the capacitive effect of the insulating material thereby reducing the effective through capacitance of the inductive winding.

An object of this invention is to provide for increasing the effective through capacitance of an inductive winding of a transformer and for uniformly distributing a surge voltage through the inductive winding, by so spirally winding three conductor coils adjacent one another and so connecting them to another corresponding three conductor coils that parallel capacitance paths are provided in the inductive winding with a minimum of insulating material between adjacent conductor coils.

Other objects of this invention will become apparent from the following description when taken in conjunction with the accompanying drawing, in which:

Figure 1 is a schematic diagram of a transformer embodying the teachings of this invention;

Fig. 2 is a right-hand elevation view of a part of the high voltage inductive winding of the transformer;

Fig. 3 is a schematic diagram illustrating the manner in which the conductor coils forming the inductive winding of one embodiment of this invention are interconnected, and Fig. 4 is a schematic diagram of another embodiment of this invention in which the manner of interconnecting the conductor coils is illustrated.

Referring to Fig. 1 there is illustrated a portion of a conventional transformer structure having a winding core leg 14 of magnetic material about which is positioned, in a well-known manner, a low voltage cylindrical-type winding 16 and a high voltage, flat disc type winding 18. As is customary, insulating material 19 is disposed between each of the conductor turns forming the high voltage winding 18. The windings 16 and 18 are insulated from each other and from the core leg 14 by insulating material 21.

As illustrated, the high voltage winding 18 comprises the annular winding sections 20, 22, 24 and 26 spaced axially apart. The winding sections 20 and 22 combined illustrate one embodiment of this invention and the winding sections 24 and 26 combined illustrate another embodiment. However, it is to be understood that in practice the winding 18 comprises, for instance, a plurality of the combined sections 20 and 22 and their interconnections as described hereinafter, or a plurality of the combined sections 24 and 26 and their interconnections as described hereinafter, or any combination of the combined sections 20 and 22 and the combined sections 24 and 26 with their respective interconnections, so that when a surge voltage occurs it will uniformly distribute itself down through the high voltage winding 18. Thus as one example, if the winding is so constructed as to comprise five of the combined sections 20 and 22 and their interconnections the surge voltage will divide substantially equally between these five combined sections. In order to simplify the drawing the embodiments illustrated have been shown in a single figure, namely in Fig. 1.

Each of the winding sections 20, 22, 24 and 26 includes three conductor coils, in particular three single layer disc coils, which are wound spirally about the axis A—A of the winding leg 14 to form a plurality of conductor turns. In particular, referring to Fig. 3, which is a schematic illustration of the conductor coils of the winding sections 20 and 22 shown in an unwound position, the winding section 20 comprises an intermediate conductor coil 30, and inner and outer conductor coils 32 and 34, respectively, disposed in the same plane and on opposite sides of the coil 30 and separated by the insulating material 19. By disposing the conductor coils 30, 32 and 34 adjacent one another substantially throughout their entire length and separating them by the insulating material 19, a high interwinding capacitance is achieved through the winding section 20.

The conductor coils 30, 32 and 34 comprise conductor turns 41 through 43, 53 through 55, and 47 through 49, respectively. When the conductor coils 30, 32 and 34 are wound spirally in an inward direction about the axis A—A of the winding leg 14, conductor turns are established in the order 47, 41, 53, 48, 42, 54, 49, 43 and 55, going from the outermost turn to the innermost one.

The winding section 22 comprises an intermediate conductor coil 36 and inner and outer conductor coils 38 and 40, respectively, disposed in the same plane and on opposite sides of the coil 36. In order to achieve the high interwinding capacitance through the winding section 22, the conductor coils 36, 38 and 40 are disposed adjacent one another throughout substantially their entire length, the insulating material 19 being disposed between conductor coils. As illustrated the conductor coils 36, 38 and 40 comprise conductor turns 56 through 58, 50 through 52, and 44 through 46, respectively, and when wound spirally in an outward direction about the axis A—A of the winding leg 14 establish the conductor turns 50, 56, 44, 51, 57, 45, 52, 58 and 46, in the order listed.

In order to form the conductor turns 41 through 58 into a continuous inductive winding and in order to form a parallel capacitance path of high capacitance value for the winding sections 20 and 22, and thereby uniformly distribute the surge voltage through the inductive winding 18, a plurality of crossover connections 80, 82, 84, 86 and 88 are provided for electrically connecting the conductor turns 49 and 50, 43 and 44, 55 and 56, 52 and 53, and 46 and 47, respectively. In accordance with the teachings of this invention, the crossover connections 86 and 88 provide a parallel capacitance path for the winding sections 20 and 22. Referring to Fig. 3, one side of this capacitance parallel path extends from the conductor turn 41 through the effective capacitance 90 between the conductor coils 30 and 32 and the effective capacitance 92 between the conductor coils 36 and 38, to the last conductor turn 58 of the winding sections 20 and 22. The other side of this parallel path extends from the conductor turn 41 through the effective capacitance 94 between the conductor coils 30 and 34 and the effective capacitance 96 between the conductor coils 36 and 40, to the conductor turn 58. The capacitance between the conductor coils 32 and 34 and between the conductor coils 38 and 40 also adds to the through capacitance of the high voltage winding 18.

It is to be noted that the voltage difference between the conductor coils 30 and 32 and between the conductor coils 30 and 34 is not of large amplitude. Therefore, the insulating material 19 disposed therebetween can be relatively thin resulting in a high capacitance between the conductor coils 30 and 32 and between the conductor coils 30 and 34. Likewise, the voltage difference between the conductor coils 36 and 38 and between the conductor coils 36 and 40 is not of large magnitude. Thus, the insulating material 19 disposed therebetween can be relatively thin resulting in a high capacitance between the conductor coils 36 and 38 and between the conductor coils 36 and 40.

Referring to Figs. 1 and 4 another embodiment of this invention is illustrated by the winding sections 24 and 26. In this embodiment the winding sections 24 and 26 are so interconnected that they establish a parallel capacitance path similar to the parallel capacitance path established by the winding sections 20 and 22. The main distinction between the second embodiment illustrated by the winding sections 24 and 26 and the embodiment illustrated by the winding sections 20 and 22 is that in the second embodiment the conductor turns of the winding section 26 are disposed differently than the conductor turns of the winding section 22.

As illustrated in Fig. 4, which is a schematic illustration of the conductor coils of the winding sections 24 and 26 shown in an unwound position, the winding section 24 comprises an intermediate conductor coil 100 and an inner and an outer conductor coil 102 and 104, respectively, which are disposed in the same plane and on opposite sides of the coil 100. The coils 102 and 104 are likewise disposed adjacent in the same plane and on opposite sides of the coil 100 substantially throughout its entire length, with the insulating material 19 disposed between the adjacent coils in order to achieve a high value for the interwinding capacitance through the winding section 24. In this instance the conductor coils 100, 102 and 104 comprise the conductor turns 59 through 61, 71 through 73, and 65 through 67, respectively. When the conductor coils 100, 102 and 104 are wound spirally in an inward direction about the axis A—A of the winding leg 14 they form the conductor turns 65, 59, 71, 66, 60, 72, 67, 61 and 73 in the order listed. This can more clearly be seen in Fig. 1.

The winding section 26 comprises an intermediate conductor coil 106, and an inner and an outer conductor coil 108 and 110, respectively. As illustrated, the conductor coils 108 and 110 are disposed adjacent in the same plane and on opposite sides of the coil 106 with the insulating material 19 disposed between the adjacent conductor coils. In this instance the conductor coils 106, 108 and 110 comprise conductor turns 74 through 76, 62 through 64, and 68 through 70, respectively. In accordance with this invention the conductor coils 106, 108 and 110 are wound spirally in an outward direction about the axis A—A of the winding leg 14 to form the conductor turns 62, 74, 68, 63, 75, 69, 64, 76 and 70, in the order listed.

In order to form the conductor turns 59 through 76 into one continuous inductive winding and in order to provide a parallel capacitance path of high capacitance value for the winding sections 24 and 26 and thereby uniformly distribute the surge voltage through the inductive winding 18, a plurality of crossover connections 112, 114, 116, 118 and 120 are provided for electrically connecting the conductor turns 73 and 74, 61 and 62, 67 and 68, 71 and 70, and 64 and 65, respectively. The parallel capacitance path can more clearly be seen in Fig. 4. One side of this parallel path extends from the conductor turn 59 through the effective capacitance 122 between the conductor coils 100 and 102 and the effective capacitance 124 between the conductor coils 106 and 110, to the conductor turn 76. The other side of this parallel path extends from the conductor turn 59 through the effective capacitance 126 between the conductor coils 100 and 104 and the effective capacitance 128 between the conductor coils 106 and 108, to the conductor turn 76.

The capacitance between the conductor coils 102 and 104 and between the conductor coils 108 and 110 also adds to the through capacitance of the high voltage winding 18.

The same advantages apply to the apparatus illustrated in Fig. 4 as apply to the apparatus illustrated in Fig. 3. That is, the winding sections 24 and 26 have a high effective through capacitance and require only relatively thin insulating material 19 between their conductor coils.

It is to be understood that the cross-over connections 80, 82, 84, 86 and 88 between the winding sections 20 and 22 and the cross-over connections 112, 114, 116, 118 and 120 between the winding sections 24 and 26 can either be formed from separate conductors welded to the respective conductor coils of the winding sections 20, 22, 24 and 26 or the sections 20, 22, 24 and 26 can be formed from a single inductive winding.

Since certain changes may be made in the above apparatus, and different embodiments of the invention could be made without departing from the scope thereof, it is intended that all matter contained in the above description or shown in the accompanying drawing shall be interpreted as illustrative and not in a limiting sense.

I claim as my invention:

1. In an inductive winding having a high effective through capacitance, the combination comprising, a pair of annular winding sections spaced axially apart, each winding section comprising three conductor coils including an intermediate conductor coil and an inner and an outer conductor coil disposed on opposite sides of the intermediate conductor coil, each of the conductor coils being wound spirally in the same direction as its adjacent conductor coils to thereby form a plurality of conductor turns disposed in each of the winding sections and separated from one another by insulating material, the conductor turns of each conductor coil being alternated with the conductor turns of the other conductor coils of the same winding section so that each winding section consists of but a single layer lying in a single plane, a crossover connection between the start of the outer conductor coil of the first winding section and the finish of the outer conductor coil of the second winding section, a crossover connection between the start of the inner conductor coil of the first winding section and the finish of the inner conductor coil of the second winding section, the start of the intermediate conductor coil of the first section forming a part of the first conductor turn of the two winding sections and the finish of the intermediate conductor coil of the second winding section forming a part of the last conductor turn of the two winding sections, whereby a parallel capacitance path is formed by the conductor coils of the winding sections and the insulating material therebetween to thereby obtain a uniform distribution of surge voltage through the inductive winding, and other crossover connections for connecting the conductor coils of the two winding sections in series circuit relationship to thereby form one continuous conductive winding, said other crossover connections including a crossover connection between the finish of the inner conductor coil of the first winding section and the start of the intermediate conductor coil of the second winding section, a crossover connection between the finish of the intermediate conductor coil of the first winding section and the start of the outer conductor coil of the second winding section, and a crossover connection between the finish of the outer conductor coil of the first winding section and the start of the inner conductor coil of the second winding section.

2. In an inductive winding having a high effective through capacitance, the combination comprising, a pair of annular winding sections spaced axially apart, each winding section comprising three conductor coils including an intermediate conductor coil and an inner and an outer conductor coil disposed on opposite sides of the intermediate conductor coil, each of the conductor coils being wound spirally in the same direction as its adjacent conductor coils to thereby form a plurality of conductor turns disposed in each of the winding sections and separated from each other by insulating material, the conductor turns of each conductor coil being alternated with the conductor turns of the other conductor coils of the same winding section so that each winding section consists of but a single layer lying in a single plane, a crossover connection between the start of the outer conductor coil of the first winding section and the finish of the inner conductor coil of the second winding section, a crossover connection between the start of the inner conductor coil of the first winding section and the finish of the outer conductor coil of the second winding section, the start of the intermediate conductor coil of the first winding section forming a portion of the first conductor turn of the two winding sections and the finish of the intermediate conductor coil of the second winding section forming a portion of the last conductor turn of the two winding sections, whereby a parallel capacitance path is formed by the conductor coils of the winding sections and the insulating material therebetween to thereby obtain uniform distribution of surge voltage through the inductive winding, and other crossover connections for connecting the conductor coils in series circuit relationship to thereby form one continuous conductive winding, said other crossover connections including a crossover connection between the finish of the inner conductor coil of the first winding section and the start of the intermediate conductor coil of the second winding section, a crossover connection between the finish of the intermediate conductor coil of the first winding section and the start of the inner conductor coil of the second winding section, and a crossover connection between the finish of the outer conductor coil of the first winding section and the start of the outer conductor coil of the second winding section.

3. In an inductive winding having a high effective through capacitance, the combination comprising, a pair of annular winding sections spaced axially apart, each winding section comprising three conductor coils including an intermediate conductor coil and an inner and an outer conductor coil disposed on opposite sides of the intermediate conductor coil, each of the conductor coils being wound spirally in the same direction as its adjacent conductor coils to thereby form a plurality of conductor turns disposed in each of the winding sections and separated from one another by insulating material, the conductor turns of each conductor coil being alternated with the conductor turns of the other conductor coils of the same winding section so that each winding section consists of but a single layer lying in a single plane, a crossover connection between the start of the outer conductor coil of the first winding section and the finish of the outer conductor coil of the second winding section, a crossover connection between the start of the inner conductor coil of the first winding section and the finish of the inner conductor coil of the second winding section, the start of the intermediate conductor coil of the first section forming a part of the first conductor turn of the two winding sections and the finish of the intermediate conductor coil of the second winding section forming a part of the last conductor turn of the two winding sections, whereby a parallel capacitance path is formed by the conductor coils of the winding sections and the insulating material therebetween to thereby obtain a uniform distribution of surge voltage through the inductive winding, other crossover connections for connecting the conductor coils of the two winding sections in series circuit relationship to thereby form one continuous conductive winding, said other crossover connections including a crossover connection between the finish of the inner conductor coil of the first winding section and the start of the intermediate conductor coil of the second winding section, a crossover connection between the finish of the intermediate conductor coil of the first winding section and the start of the outer conductor coil of the second winding section, and a crossover connection between the finish of the outer conductor coil of the first winding section and the start of the inner conductor coil of the second winding section, and another conductive winding similar to said continuous conductive winding and connected in series circuit relationship therewith.

4. In an inductive winding having a high effective through capacitance, the combination comprising, a pair of annular winding sections spaced axially apart, each winding section comprising three conductor coils including an intermediate conductor coil and an inner and an outer conductor coil disposed on opposite sides of the intermediate conductor coil, each of the conductor coils being wound spirally in the same direction as its adjacent conductor coils to thereby form a plurality of conductor turns disposed in each of the winding sections and separated from each other by insulating material, the conductor turns of each conductor coil being alternated with the conductor turns of the other conductor coils of the same winding section so that each winding section consists of but a single layer lying in a single plane, a crossover connection between the start of the outer conductor coil of the first winding section and the finish of the inner conductor coil of the second winding section, a crossover connection between the start of the inner conductor coil of the first winding section and the finish of the outer conductor coil of the second winding section, the start of the intermediate conductor coil of the first winding section forming a portion of the first conductor turn of the two winding sections and the finish of the intermediate conductor coil of the second winding section forming a portion of the last conductor turn of the two winding sections, whereby a parallel capacitance path is formed by the conductor coils of the winding sections and the insulating material therebetween to thereby obtain uniform distribution of surge voltage through the inductive winding, other crossover connections for connecting the conductor coils in series circuit relationship to thereby form one continuous conductive winding, said other crossover connections including a crossover connection between the finish of the inner conductor coil of the first winding section and the start of the intermediate conductor coil of the second winding section, a crossover connection between the finish of the intermediate conductor coil of the first winding section and the start of the inner conductor coil of the second winding section, and a crossover connection between the finish of the outer conductor coil of the first winding section and the start of the outer conductor coil of the second winding section, and another conductive winding similar to said continuous conductive winding and connected in series circuit relationship therewith.

5. In an inductive winding having a high effective through capacitance, the combination comprising, at least three adjacent single layer disc coils each of which includes a number of conductor turns having insulating material disposed therebetween, each of the single layer disc coils being wound spirally in the same direction as its adjacent single layer disc coils and the conductor turns of the three single layer disc coils being alternated to form a first single layer winding section lying in a single plane, the first single layer winding section having two intermediate conductor turns and a first conductor turn disposed between and adjacent to the two intermediate conductor turns, at least three other adjacent single layer disc coils each of which includes a number of conductor turns having insulating material disposed therebetween, each of said other adjacent single layer disc coils being wound spirally in the same direction as its adjacent single layer disc coils and the conductor turns of the said other adjacent single layer disc coils being alternated to form a second single layer winding section lying in a single plane and spaced axially from the first single layer winding section, the second single layer winding section having two intermediate conductor turns and a last conductor turn disposed between and adjacent to the two intermediate conductor turns of the second single layer winding section, the two intermediate conductor turns of the first single layer winding section being directly connected to the two intermediate conductor turns of the second single layer winding section, and means for connecting the disc coils of the two single layer winding sections in series circuit relationship with one another to thus form one continuous conductive winding, to thereby connect the capacitance existing between said first conductor turn and one of said intermediate conductor turns adjacent thereto and the capacitance between said last conductor turn and one of said intermediate conductor turns adjacent thereto in parallel circuit relationship with the capacitance between the said first conductor turn and the other of said intermediate conductor turns adjacent thereto and the capacitance between the said last conductor turn and the other of said intermediate conductor turns adjacent thereto, to thus obtain a high effective through capacitance for the inductive winding with a minimum of insulating material between the conductor turns.

References Cited in the file of this patent

UNITED STATES PATENTS 2,453,552     Stearn _____ Nov. 9, 1948

FOREIGN PATENTS 552,874     Great Britain _____ Apr. 28, 1943